United States Patent [19]

Dunchock et al.

[11] 4,330,150
[45] May 18, 1982

[54] REMOVABLE ROOF PANEL FOR VEHICLES

[76] Inventors: Richard S. Dunchock, 27545 Gateway Dr., Farmington Hills, Mich. 48018; Sam M. Alagna, 5391 Folkstone, Troy, Mich. 48098

[21] Appl. No.: 150,934

[22] Filed: May 19, 1980

[51] Int. Cl.³ .............................................. B60J 7/10
[52] U.S. Cl. ................................... 296/218; 296/219
[58] Field of Search ............... 296/100, 101, 218, 216, 296/224, 210, 219, 220, 221, 222; 160/105, 107

[56] References Cited

U.S. PATENT DOCUMENTS

| | | | |
|---|---|---|---|
| 1,825,538 | 9/1931 | Pace | 160/105 |
| 3,348,877 | 10/1967 | Caramanna | 296/219 |
| 4,104,875 | 8/1978 | Hosmer | 296/218 |
| 4,138,155 | 2/1979 | Chrysler | 296/218 |
| 4,157,845 | 6/1979 | Queveau | 296/220 |
| 4,210,361 | 7/1980 | Marvin et al. | 296/219 X |
| 4,226,052 | 10/1980 | De Stepheno | 296/218 |

FOREIGN PATENT DOCUMENTS

| | | | |
|---|---|---|---|
| 1111964 | 7/1961 | Fed. Rep. of Germany | 296/219 |
| 1650 | of 1914 | United Kingdom | 296/219 |

*Primary Examiner*—David M. Mitchell
*Attorney, Agent, or Firm*—Basile, Weintraub & Hanlon

[57] ABSTRACT

A removable roof panel for motor vehicles of the type having an access opening which is adapted to be covered by the removable panel. In a preferred embodiment of the invention the removable roof panel is fabricated from a pair of wire frame members pivotally joined to permit the roof panel to be folded and stored when not in use. The roof panel frame member is covered with a suitable weather-resistant material. In a second embodiment of the invention, the roof panel is fabricated from a plastic material which is of sufficient rigidity to facilitate the use of the roof panel to cover the access opening, but flexible enough to be folded for storage.

4 Claims, 12 Drawing Figures

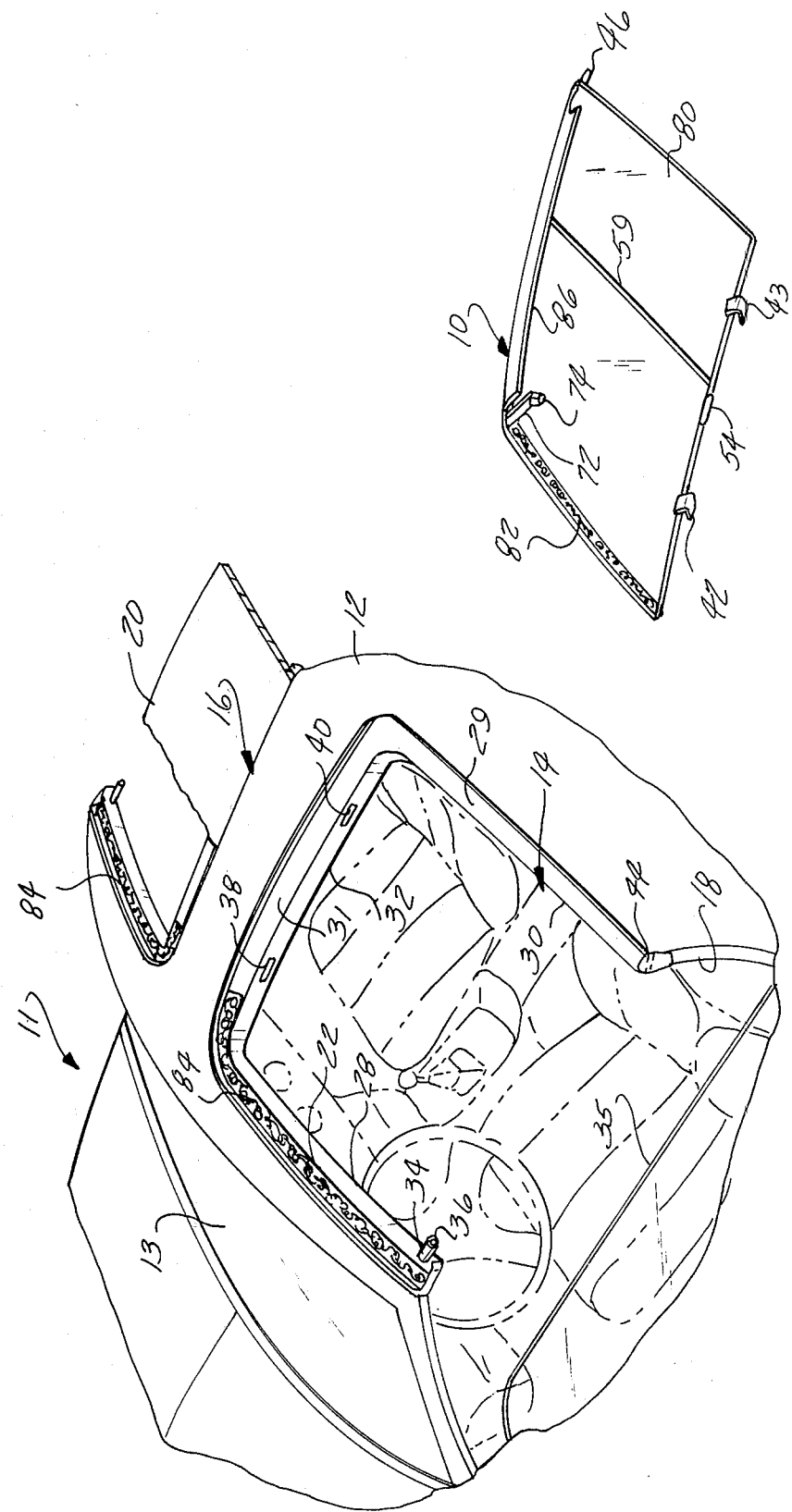

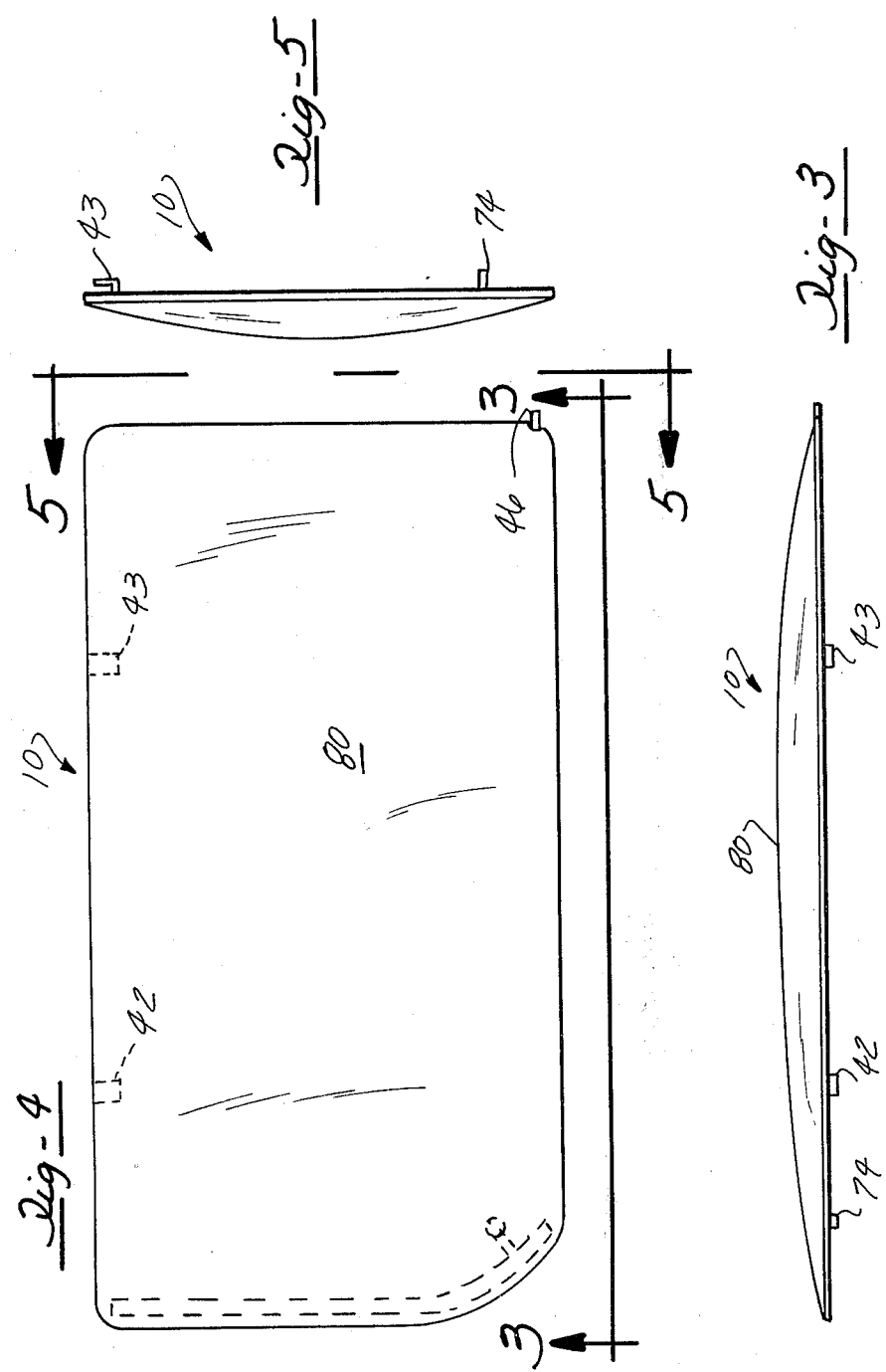

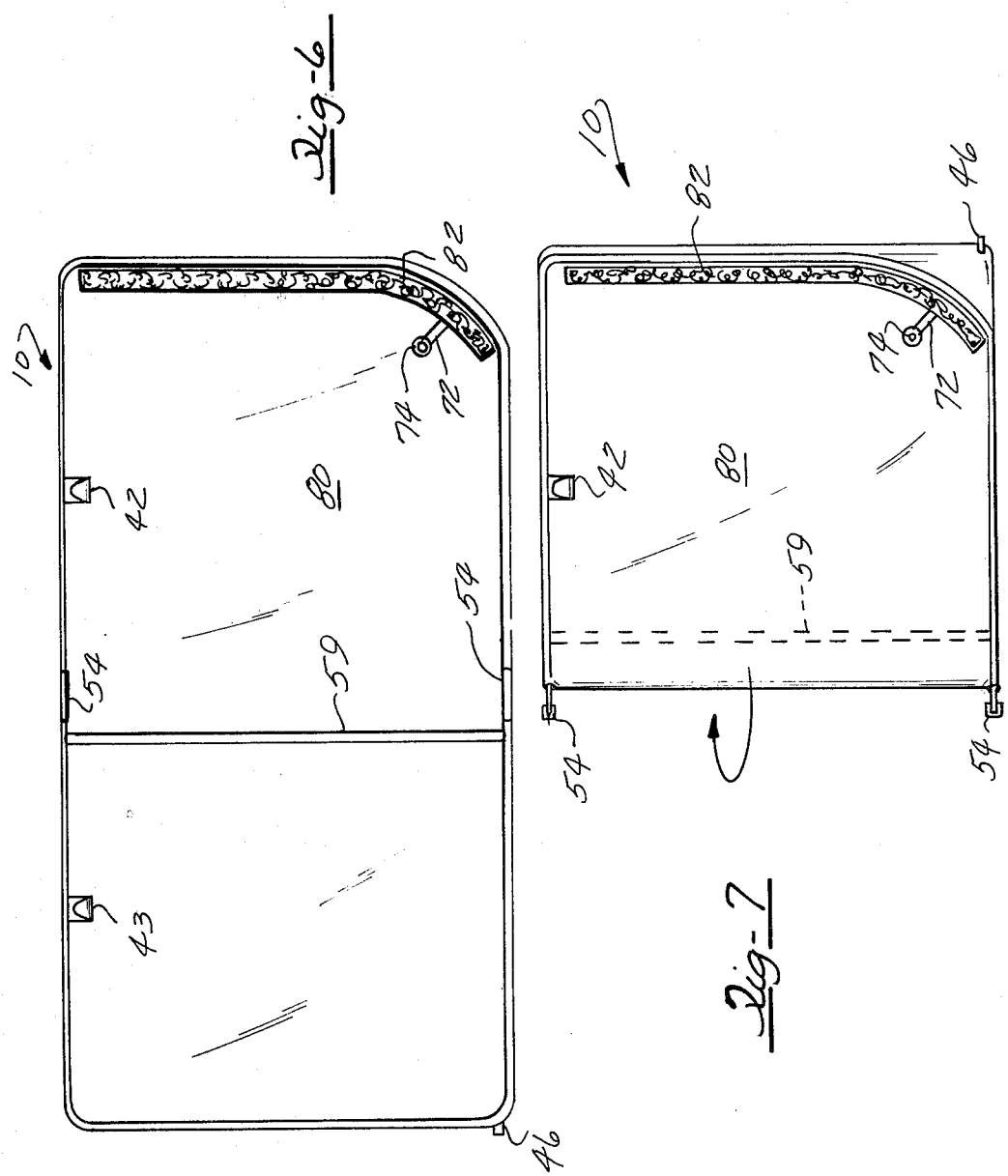

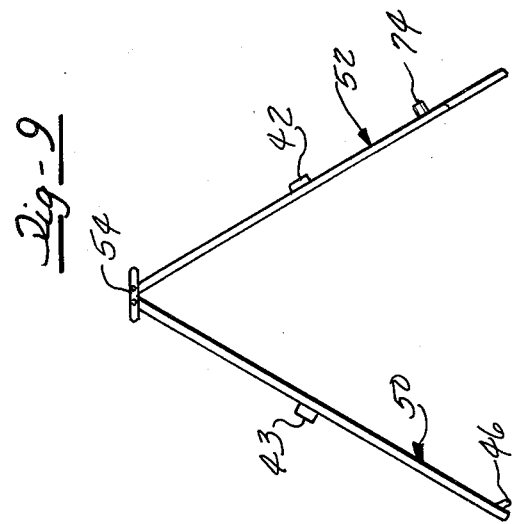
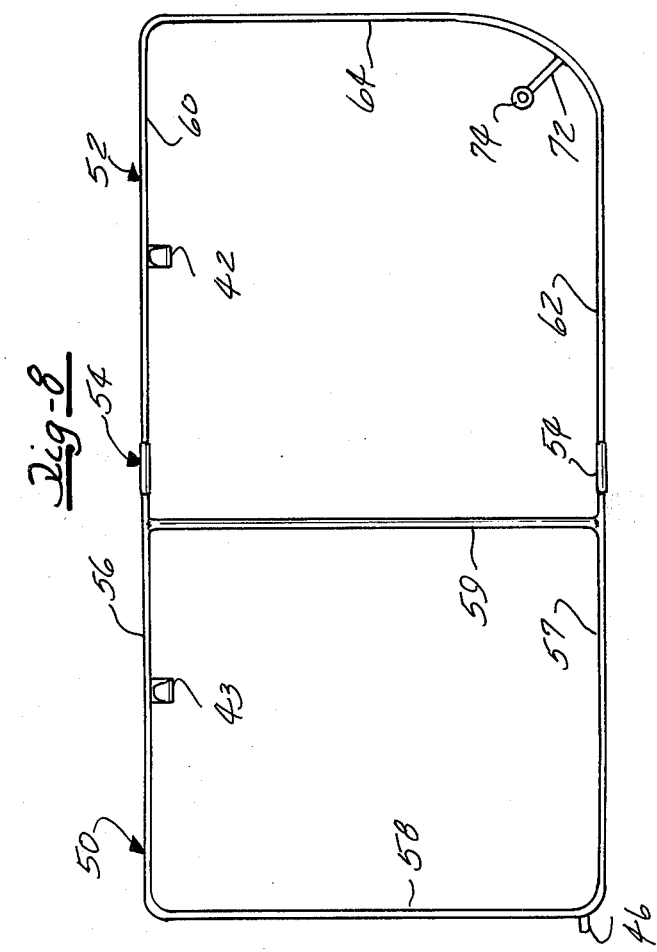

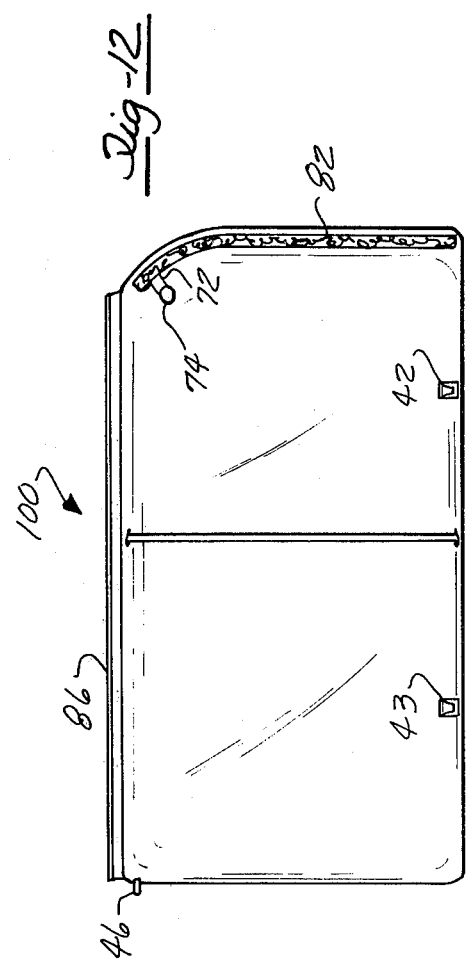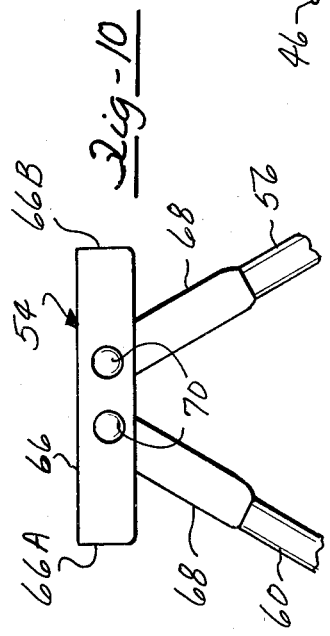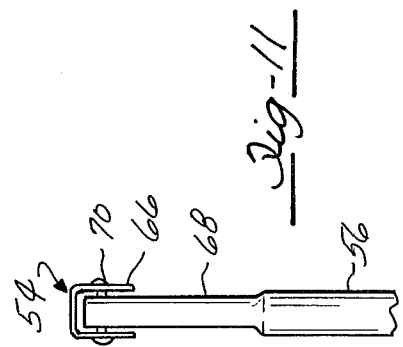

REMOVABLE ROOF PANEL FOR VEHICLES

BACKGROUND OF THE INVENTION

I. Field of the Invention

The present invention relates to vehicle bodies and, more particularly, to removable panel arrangements for the roof of vehicles and, specifically, to a collapsible roof panel.

II. Description of the Prior Art

Removable panels have been provided of the type in which a pair of panels are disposed in association with the door opening at opposite sides of the vehicle. Examples of such panels are disclosed in U. S. Pat. Nos. 2,556,062 and 4,120,529. Such arrangements are commonly referred to as T-tops or hatch tops and include rigid and heavy panel portions that are adapted to enclose the roof access openings which define the T-top or hatch top configurations. The roof panels, such as the type disclosed in U.S. Pat. No. 4,120,529, are large, relatively heavy and are difficult to use. Because of their size and weight they must either be stored in the trunk of the automobile or left in storage at a garage or the like. If an individual is utilizing such a T-top roof with conventional removable panels and desires to enclose the automobile for a short period of time, it is necessary to remove the roof panels from the automobile trunk and position them on the car. Because it is both difficult and time consuming to remove the roof panels, many users simply do not remove the panels at all. This reluctance on the part of the user to remove the roof panels defeats the entire purpose of such roof configurations. It would therefore be desirable to provide a simple and inexpensive means to permit the users of such T-top and hatch top configurations to quickly enclose the access openings without the need for having to utilize the more permanent and heavier roof panels that are provided by the manufacturer.

Other prior art of which the applicant is aware are U.S. Pat. Nos. 1,245,278; 2,897,002; 3,156,497; 3,373,792; and 3,964,783.

III. Prior Art Statement

In the opinion of the applicant and applicant's attorney, the aforementioned prior art represents the most relevant prior art of which the applicant and applicant's attorney are aware.

SUMMARY OF THE INVENTION

The present invention, which will be described subsequently in greater detail, comprises a removable roof panel for motor vehicles of the type having a windshield and a rigid roof portion extending rearwardly therefrom. The roof portion is provided with at least one access opening having first and second marginal edges successively and rearwardly spaced from the windshield and extending inwardly from the side of the roof portions. A third marginal edge connects the first and second access marginal edges. The removable roof panel is adapted to cover the access opening and includes a body portion having an outer contour mating with the access opening so as to enclose the same when the body portion overlies the access opening. The body portion is fabricated from a light-weight foldable material such that the removable roof panel may be folded for easy storage.

It is therefore a primary object of the present invention to provide a removable panel for vehicle roofs in which the roof panel is removably and releasably attached to the roof so as to enclose the access opening defined therein and in which the removable roof panel is foldable for easy storage.

It is another object of the present invention to provide a removable roof panel for vehicles which is of a simple construction, light-weight and easy to use and store.

It is another object of the present invention to provide an improved removable roof panel for vehicles which maintains the vehicle roof in a weather-resistant condition.

Other objects, advantages and applications of the present invention will become apparent to those skilled in the art of removable roof panels for vehicles when the accompanying description of several examples of the best modes contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 1 is a perspective view of a roof portion of a vehicle body with an access opening formed in the roof of the vehicle body with the access opening being adapted to be enclosed by a removable roof panel;

FIG. 2 is a bottom perspective view of a removable roof panel constructed in accordance with the principles of the present invention and adapted to be inserted into the access opening illustrated in FIG. 1;

FIG. 3 is a side elevational view of the removable roof panel as seen from Line 3—3 of FIG. 4 with the resilient window seal removed;

FIG. 4 is a top plan view of the removable roof panel illustrated in FIG. 2;

FIG. 5 is a rear elevational view of the removable roof panel as seen from Line 5—5 of FIG. 4 with the resilient window seal removed;

FIG. 6 is a bottom elevational view of the removable roof panel with the resilient window seal removed;

FIG. 7 is a plan view of the roof panel shown in a folded condition with the resilient window seal removed;

FIG. 8 is a bottom elevational view of the removable roof panel with the skin covering removed illustrating the frame of the roof panel;

FIG. 9 is a side elevational view of the roof panel frame illustrated n FIG. 8 showing the frame in a partially folded position;

FIG. 10 is an enlarged elevational view of FIG. 9 illustrating the pivot arrangement utilized for folding the frame that forms the roof panel;

FIG. 11 is a fragmentary side elevational view of the pivot arrangement as seen from Line 11—11 of FIG. 10; and FIG. 12 is a bottom elevational view of a second embodiment of the present invention.

DESCRIPTION OF THE PREFERRED EMBODIMENTS

Referring now to the drawings and, in particular, to FIGS. 1 and 2 wherein there is illustrated one example of the present invention in the form of a removable, collapsible roof panel 10. The removable roof panel 10 is adapted to be utilized with an automobile vehicle body 11 having a roof portion 12 extending rearwardly from a windshield 13.

As can best be seen in FIG. 1, the roof portion 12 is provided with a pair of access openings 14 and 16 and are normally referred to as the T-top or hatch top openings. The access openings 14 and 16 are, respectively, extensions of the window openings 18 disposed on opposite sides of the longitudinal centerline of the vehicle body 11. As referenced in the aforementioned U.S. Pat. No. 4,120,529, the access openings 14 and 16 are adapted to be closed by detachable rigid panels, one of which is shown in the closed position in FIG. 1 and identified by the numeral 20. As is conventional with such structures, the openings 14 and 16 are adapted to be closed with the detachable panels 20 to form a water-tight roof assembly. When the panels 20 are removed, the access openings are accessible, such as the access opening 14 in FIG. 1. As is also conventional with such constructions, the access openings 14 and 16 are formed by portions of a forward frame member 27, a rearward frame member 29 and a central frame member 31. The frame members 27, 29 and 31 respectively form the three sides or marginal edges 28, 30 and 32 of each of the openings 14 and 16. The fourth side of the openings merges with the window openings 18. When the conventional panels 20 are in place, the outer edge portion of the panels 20 form the fourth side and act to engage the upper edge of the windows 35, which close the window openings 18.

The marginal edge 28 includes an arm member 34 which extends rearwardly and outwardly from the edge 28 to terminate in an apertured portion 36 that forms a part of a locking mechanism adapted to secure the inventive roof panel 10 to the access openings, all of which will be described in greater detail hereinafter. The marginal edge 32 is provided with a pair of spaced apertures 38 and 40 which are adapted respectively to receive U-shaped flange members 42 and 43 (see FIG. 2), which will be described in detail hereinafter. The marginal edge 30 is provided with an aperture 44 which is adapted to receive a support post 46 carried on the rear end of the roof panel 10, as shown in FIG. 2. The purpose of the various apertures and support posts will be described in detail hereinafter in the description of the manner in which the inventive roof panel is fabricated and utilized.

Referring now to FIGS. 8 through 11 for an understanding of the inner structure of the roof panel 10, it can be seen that the roof panel 10 comprises a pair of frame sections 50 and 52 which are pivotally secured to each other at pivot connectors 54. The frame section 50 is fabricated from parallel wire members 56 and 57 which are connected by wire cross members 58 and 59. The various members of the frame section 50 may be of an integral construction or may be connected by any suitable means, such as by welding. The longitudinal wire member 56 carries the U-shaped flange member 43 which, as indicated hereinbefore, is adapted to be inserted into the apertured opening 40 in the marginal edge 32 of the access opening 14.

The frame section 52 comprises a U-shaped wire which has leg members 60 and 62 that define the longitudinal wire members of the frame 52 and a base 64 which defines its cross member. The cross members 64 and 59 are of the same length so that the longitudinal wire members 56–60 and 57–62 are alined for pivotal engagement at the pivotal connectors 54 in the manner illustrated in FIG. 8.

As can best be seen in FIGS. 9, 10 and 11, the pivotal connectors 54 each comprise an elongated U-shaped pivot member 66. The respective ends of the longitudinal members 56, 57 and 60, 62 are flattened, as shown by the numeral 68 in FIG. 11, so as to be received within the confines of the U-shaped pivot member 66. Suitable support pins 70 extending through appropriate apertures in the pivot member 66 and the flattened end 68 of each of the longitudinal wire members of the frame sections pivotally secure the wire members to each other, such that the frame sections 50 and 52 may be pivoted from a first position wherein they are disposed in the same horizontal plane, as shown in FIGS. 2, 6 and 8, to a second position where the frame sections are collapsed and the frame members 50 and 52 are brought into a position of an abutting parallel relationship, as shown in FIG. 7. FIG. 9 illustrates the frame sections in a partially collapsed position for the purpose of illustrating how the pivoting is accomplished and the relationship of the wire member ends 68 to the pivot member 66. The extended outer ends 66A and 66B of the pivot member 66 function to overlie the flat ends 68 of the longitudinal wire members and provide support while limiting further pivotal movement of the wire members with respect to pivot member 66. Thus, once the frame sections 50 and 52 have been brought to an opened, horizontal position shown in FIGS. 2, 6 and 7, further opening of the frame sections is prevented.

The frame section 60 also includes the U-shaped member 42 which is (similar to the flange member 43) adapted to be inserted into the aperture 40 to secure the associated marginal edge of the roof panel 10 to the marginal edge 32 of the access opening 14. The end of the frame section wire member 57 at the juncture with the cross member 58 is provided with the aforementioned attachment post 46, which is adapted to be inserted into the aperture 44 formed at the outer end of the marginal edge 30 in the access opening 14. Thus, the post 46 functions to secure the marginal rear edge of the roof panel 10 (defined by the frame cross member 58) to the marginal edge 30 of the access opening 14.

The cross member 64 mounts an inwardly extending support member 72 that terminates in a locking post 74. The locking post 74 is adapted to be received within the locking aperture 36, described hereinbefore and illustrated in FIG. 1 of the drawings, so as to secure the marginal edge defined by the cross member 64 of the roof panel 10 to the marginal edge 28 of the opening 14. The locking post 72 and the locking aperture 36 may be of a variety of designs to ensure releasable engagement. For example, the securing means may include a friction engagement between the post 74 and the aperture 36 or the lower end of the post 74 may be provided with a pivot member that may extend horizontally once the post 74 extends through the aperture 36 to thereby prevent removal of the post 74 from the aperture 36.

As can best be seen in FIGS. 2 through 7 of the drawings, the frame sections 50 and 52 are covered with a suitable skin 80 which will aesthetically mate with the vehicle roof 12, but one which is both water-resistant and flexible so as to permit the simple and easy folding of the frame sections 50 and 52 to the position illustrated in FIG. 7. The skin 80 may be made from a variety of suitable materials, such as a polyurethane, a polyester, canvas or other suitable and well-known materials which are waterproof, of sufficient strength and which are very flexible. The skin 80 may be attached to the frame sections 50 and 52 by any suitable means such as by having the skin 80 wrap around the various wire members of the frame sections and then sewed togeher. The bottom of the marginal edge of the roof panel 10 which is defined by the cross member 64 and the skin 80 overlying the same has a strip of adhesive and, preferably, a strip of Velcro attached thereto and identified by the numeral 82. A corresponding and mating strip of such adhesive material, such as Velcro, is disposed at 84 along the frame member 27 adjacent and above the marginal edge 28.

It can thus be seen that when the flanges 42 and 43 are respectively inserted into the apertures 38 and 40, the support post 46 inserted into the opening 44 and the locking post 70 inserted into the locking aperture 36, the roof panel 10 will be secured to the access opening 14. At the same time the Velcro surface 82 will engage the mating Velcro surface 84 to provide an air-resistant seal along the entire forward edge of the roof panel 10. Thus, during forward motion of the automobile, even at a relatively high speed, air will not pass through and under the roof panel 10. Thus, a very simple means is provided for eliminating what would otherwise be an annoying aspect of the removable roof panel 10.

As can best be seen in FIG. 2, the roof panel 10 is provided with a rubber or otherwise resilient material 86 which extends along that portion of the marginal edge of the roof panel 10 defined by the frame members 57 and 62. The resilient member 86 defines a seal which is engaged by the upper edge of the window 35 when the same is closed so as to provide an air and water resistant seal.

Referring now to FIG. 12 there is illustrated a second embodiment of the present invention in the form of a removable, collapsible panel 100. The panel 100 is similar to the panel 10 in its function and manner of use in that it is provided with a pair of flanges 42, a locking post 74 and a support post 46. The panel 100 differs from the panel 10 in that it does not utilize the frame sections 50 and 52, but is fabricated from a sheet of plastic material which has sufficient rigidity such that it may be disposed in a horizontal plane and maintain its shape when attached to the vehicle roof 12 to cover the access opening 14, but is flexible enough that it may be folded into a stored position, similar to the embodiment of the invention as shown in FIG. 7. Suitable materials which may be utilized for the fabrication of such a panel are polyurethane materials and other plastics which are known to those skilled in the art of flexible materials While only two embodiments of the present invention are shown, it should be understood by those skilled in the art that other forms of the invention may be had, all coming within the spirit of the invention and scope of the appended claims. For example, the various locking mechanism disclosed herein may be easily modified and others adapted. Those shown are preferably adapted for use for enclosing hatch roofs of the type employed on Corvette models manufactured by the General Motors Corporation. Other types of T-top, hatch openings and rectangular openings in roofs may be enclosed by other locking and latch mechanisms, all of which will be particularly suited for the type of configuration employed, it being understood that the utilization of the flexible, collapsible and/or foldable roof panel to enclose such roof openings is the object of the present invention and accomplished by the embodiments disclosed herein.

What is claimed is as follows:

1. A removable panel for motor vehicles of the type having a windshield and a rigid roof portion including an access opening with first and second marginal edges spaced rearwardly from the windshield and extending inwardly from the side of said roof portion, a third marginal edge connecting the inward end of said first and second marginal edges to define the opening, said roof panel comprising:
    a rigid folding frame having marginal edges complimentary to the opening contoured to overlie and engage said access opening marginal edges;
    said folding frame defining the marginal edges of the panel and stretching said panel in a longitudinal and transverse direction;
    a first of said frame marginal edges being adapted to overlie said first marginal edge of said access opening and having means disposed at the interface of said body portion first marginal edge and said access opening first marginal edge for releaseably securing and sealing said interfaced edges to prevent the passage of air thereby;
    means carried by a second and third marginal edge of said body portion for releaseably engaging respectively said second and third access opening marginal edges, said rigid frame being comprised of a first frame portion hingedly attached to a second frame portion to permit said rigid frame to be folded for easy storage; and
    a foldable material overlaying said rigid frame.

2. The removable roof panel defined in claim 1 wherein said frame is metal.

3. The removable roof panel defined in claim 1 wherein said foldable material is fabricated from plastic.

4. The removable roof panel of claim 1 wherein at least one said frame marginal edge includes a Velcro material extending therealong to secure said marginal edge to the vehicle and prevent the passage of air thereby.

* * * * *